(12) United States Patent
Lapprand et al.

(10) Patent No.: US 10,754,069 B2
(45) Date of Patent: Aug. 25, 2020

(54) OPHTHALMIC LENS HAVING DIFFERENT ANTI-FOULING PROPERTIES ON EACH OF THE TWO SURFACES THEREOF AND MANUFACTURING METHODS

(71) Applicant: Essilor International, Charenton le Pont (FR)

(72) Inventors: Aude Lapprand, Charenton le Pont (FR); Pascale Lacan, Charenton le Pont (FR); Christophe Valenti, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 311 days.

(21) Appl. No.: 15/323,281

(22) PCT Filed: Jul. 3, 2015

(86) PCT No.: PCT/FR2015/051848
§ 371 (c)(1),
(2) Date: Dec. 30, 2016

(87) PCT Pub. No.: WO2016/001605
PCT Pub. Date: Jan. 7, 2016

(65) Prior Publication Data
US 2018/0172884 A1 Jun. 21, 2018

(30) Foreign Application Priority Data
Jul. 3, 2014 (FR) .................................. 14 56414

(51) Int. Cl.
| | |
|---|---|
| G02B 1/18 | (2015.01) |
| G02C 7/02 | (2006.01) |
| B32B 27/00 | (2006.01) |
| G02C 7/04 | (2006.01) |
| G02B 1/04 | (2006.01) |

(52) U.S. Cl.
CPC ................ G02B 1/18 (2015.01); G02C 7/02 (2013.01); G02C 7/049 (2013.01); G02B 1/043 (2013.01)

(58) Field of Classification Search
USPC ................. 428/412, 426; 351/159.01, 159.8
See application file for complete search history.

(56) References Cited

U.S. PATENT DOCUMENTS

| | | | | |
|---|---|---|---|---|
| 4,338,375 A | * | 7/1982 | Hashimoto .......... | C09D 183/04 106/287.14 |
| 5,049,414 A | * | 9/1991 | Kato .................... | G02B 1/111 106/287.14 |
| 5,892,600 A | * | 4/1999 | Kuo ...................... | G02C 7/00 351/44 |
| 7,811,628 B2 | * | 10/2010 | Hsu ..................... | C08J 7/065 427/164 |
| 2003/0049370 A1 | | 3/2003 | Lacan et al. | |
| 2006/0148971 A1 | * | 7/2006 | Jing ...................... | C08J 3/005 524/520 |
| 2006/0246278 A1 | | 11/2006 | Lacan et al. | |
| 2008/0117382 A1 | | 5/2008 | Lacan et al. | |
| 2008/0271844 A1 | | 11/2008 | Lacan et al. | |
| 2009/0155582 A1 | | 6/2009 | Habassi et al. | |
| 2009/0174862 A1 | | 7/2009 | Lacan et al. | |
| 2009/0242527 A1 | * | 10/2009 | Anger ................ | B23K 26/0876 219/121.69 |
| 2010/0201940 A1 | * | 8/2010 | Santan ................... | G02B 1/043 351/159.57 |
| 2010/0265459 A1 | | 10/2010 | Lacan et al. | |
| 2011/0033616 A1 | | 2/2011 | Lacan et al. | |
| 2012/0272800 A1 | | 11/2012 | Lacan et al. | |
| 2015/0062704 A1 | | 3/2015 | Henky et al. | |

FOREIGN PATENT DOCUMENTS

| | | |
|---|---|---|
| EP | 1 392 613 | 3/2004 |
| EP | 1 633 684 | 3/2006 |
| FR | 2 860 306 A1 | 4/2005 |
| FR | 2 901 552 A1 | 11/2007 |
| WO | WO 02/092524 A1 | 11/2002 |
| WO | WO 2004/110946 A1 | 12/2004 |
| WO | WO 2012/153072 A1 | 11/2012 |

OTHER PUBLICATIONS 5 page brochure of Critical Surface Tension and Contact Angle with Water for Various Polymers by Diversified Enterprises, Copyrighted in 2014.*
International Search Report dated Sep. 18, 2015 in PCT/FR2015/051848 filed Jul. 3, 2015.

* cited by examiner

*Primary Examiner* — Tae H Yoon
(74) *Attorney, Agent, or Firm* — Oblon, McClelland, Maier & Neustadt, L.L.P.

(57) ABSTRACT

The present invention relates to an ophthalmic lens whose front and rear faces are differentiated with respect to their hydrophobic properties. Said lens comprising a substrate having a hydrophobic front main face, and a rear main face whose external surface has a receding contact angle with water greater than or equal to 80°, the external surface of said front main face having a receding contact angle with water lower than that of the rear main face. The invention presents various means for preparing such lenses, which may notably be obtained after deposition and then removal of temporary layers with different thicknesses on the two faces of the lens.

27 Claims, No Drawings

OPHTHALMIC LENS HAVING DIFFERENT ANTI-FOULING PROPERTIES ON EACH OF THE TWO SURFACES THEREOF AND MANUFACTURING METHODS

This application is a National Stage of PCT/FR2015/051848, which was filed on Jul. 3, 2015. This application is based upon and claims the benefit of priority to French Application No. 1456414, which was filed on Jul. 3, 2014.

The present invention relates to an ophthalmic lens, comprising a coating having a receding contact angle with water of at least 80° on its rear face, and whose two faces differ in their antisoiling properties, intermediate ophthalmic lenses comprising one or more temporary layers serving for preparing these lenses, as well as methods of manufacture of these lenses.

Application of antisoiling coatings, also called "hydrophobic and/or oleophobic coatings", on ophthalmic lenses for glasses is known. They are generally obtained from fluorosilanes or fluorosilazanes, i.e. silanes or silazanes containing fluorine atoms.

Antisoiling coatings lower the surface energy of the lens, so that the adherence of dirt is reduced and the latter is more easily removable by wiping, notably using microfibre cloths.

Thus, the antisoiling coatings with the best performance possess low surface energies, typically surface energies less than or equal to 14 $mJ/m^2$, and generally less than or equal to 12 $mJ/m^2$.

Surface energies are calculated in the present application by the OWENS-WENDT method described in the following reference: "Estimation of a surface force energy of polymers" OWENS D. K., WENDT R. G. (1969) J. Appl. Polym. Sci, 13, 1741-1747.

Hydrophobic and/or oleophobic antisoiling coatings are applied on the front face and on the rear face of commercial ophthalmic lenses.

Generally, rear face (or concave face) of an ophthalmic lens means the face which, when the lens is in use, is closest to the wearer's eye. Conversely, front face (or convex face) of the lens means the face which, when the lens is in use, is farthest from the wearer's eye.

In practice, the commercial ophthalmic lenses for glasses have identical antisoiling properties on both faces or appreciably better antisoiling properties on their front face and it is commonly assumed that the front face of an ophthalmic lens is the face most subject to external stresses and in particular to soiling.

The technical problem associated with edging/trimming is now described in more detail.

A lens results from a succession of operations of moulding and/or surfacing/polishing that determine the geometry of the two optical surfaces, convex and concave, of said lens, and then appropriate surface treatments.

The last step for finishing an ophthalmic lens is the edging operation (or trimming), which consists of machining the edge or periphery of the lens so that it conforms to the dimensions and shape required for adapting this lens to the spectacle frame in which it is intended to be mounted. It is generally carried out by the optician, who then fits the glasses in the frame.

Edging is generally carried out on a grinder comprising diamond wheels and/or milling heads for machining the periphery (or edge) of the lens. The lens is held during this operation by blocking devices acting axially.

The relative movement of the lens relative to the grinding wheel is controlled, generally numerically, in order to produce the desired shape.

As will be apparent, it is absolutely imperative that the lens is held firmly during this movement. For this, before the edging operation, an operation of blocking of the lens is performed, i.e. a holding means will be positioned generally on the convex surface of the lens.

Generally, the holding means is a block-piece that adheres to the lens owing to a holding block (or fixing block), such as a self-adhesive pad, for example a block comprising an adhesive on both faces (generally of the PSA type—pressure sensitive adhesive). This holding block is arranged between the block-piece and the convex and/or concave lens surface, preferably the convex surface.

According to another embodiment, the holding means is a block-piece that adheres to the lens owing to a polymerizable (hardenable) liquid adhesive arranged between the block-piece and the convex and/or concave lens surface, preferably the convex surface (OBM™ process of the Satisloh company). The block-piece may also be moulded integrally on the lens.

The block-piece to which the lens adheres via the adhesive block is then fixed mechanically on a first axial blocking device of the grinder and a second axial blocking device will block the lens by means of a stop, generally made of elastomer, by applying a central force on the face of the lens opposite the block-piece (generally its concave face).

During machining, a tangential turning force is generated on the lens, which may generate rotation of the latter relative to the block-piece if the lens holding system is not sufficiently effective. Good holding of the lens mainly depends on good adherence at the holding means/lens surface interface.

One of the problems caused by the low surface energies of the hydrophobic and/or oleophobic layers is that adherence at the holding means/lens interface is impaired, which makes satisfactory edging operations difficult. The lens may in fact slide and become misaligned during the edging step.

When edging is carried out satisfactorily, the lens has the required dimensions for suitable insertion in the frame that is intended for it. More precisely, this result is obtained when, in the edging operation, the lens suffers maximum misalignment of 1 or 2°. Beyond that, the lens is generally lost. Adhesion of the holding means to the lens surface is therefore essential to obtain satisfactory edging.

To overcome these difficulties in the edging of lenses provided with a hydrophobic and/or oleophobic external coating, a technical solution exists that consists of forming, on these coatings, temporary coatings (or temporary layers/top layers) of an organic or mineral nature making it possible to avoid misalignment during edging, while preserving the antisoiling properties of the coating. The temporary coatings may in particular be temporary layers of $MgF_2$, peelable coatings of a polymeric nature or temporary adhesive films of a polymeric nature. These temporary layers are notably described in applications EP 1392613, EP 1633684, WO 2005/015270, and WO 03/057641.

The lenses are supplied to the optician provided with the temporary layers.

In practice, even if the front face of the lens is generally the only one that will be in contact with the block-piece during edging, usually the same temporary layer is deposited on the rear face of the lens as on the front face of the lens (same material, same thickness). The temporary layer present on the rear face contributes to good holding of the lens by ensuring good contact between its rear face and the edging stop.

The torsional moment is distributed between the front face and the rear face of the lens during the edging operation.

Thus, the presence of a temporary layer on the rear face of the lens also helps to limit the misalignment of the lens during the edging operation.

After edging of the lens, the temporary layers must be removed to reveal the antisoiling coating. This operation is also carried out by the optician who undertook the edging of the glass. Once the temporary layer is removed, the properties of the hydrophobic coating, even if they are well preserved overall, may sometimes be inferior to those of the coating before deposition of the temporary layer. In particular, the contact angle may be a few degrees lower relative to that of the hydrophobic coating before deposition of the temporary layer, which means that the hydrophobic properties of the coating have been diminished.

Moreover, durability (maintenance of the hydrophobic properties of the coating under the effect of repeated wiping) may be affected.

Application FR 1262953 proposes a solution for obtaining, after removal of the temporary layer, an ophthalmic lens with improved antisoiling properties relative to the ophthalmic lenses comprising a hydrophobic coating and a conventional temporary layer, such as a top layer of metal fluoride. This application typically proposes depositing two hydrophobic and/or oleophobic coating layers on the lens (a layer of Optool DSX® and a layer of OF210®) and then a two-layer temporary layer made up of a layer of $MgF_2$ from 22 to 50 nm in thickness and an optional layer of MgO).

The problem is that it is still difficult to make large improvements in the antisoiling properties of a lens while at the same time maintaining the capacity for edging and sufficiently easy removal of the temporary layer.

These are conflicting properties.

Although it is desirable to increase the thickness of the hydrophobic and/or oleophobic coatings in order to reach maximum levels of hydrophobicity and oleophobicity and therefore provide glasses that are easier to keep clean, adherence of the block is lost.

As a corollary, increasing the thickness of the temporary layer makes it more difficult to remove.

Thus, many technical problems have yet to be solved for supplying new lenses with improved hydrophobicity.

Thus, one aim of the invention is to provide an ophthalmic lens having improved antisoiling performance relative to the existing ophthalmic lenses.

For example, the materials used as hydrophobic layers, in particular the materials with best performance, displaying high hydrophobicity, are expensive.

Now, it is important to be able to develop access of the antisoiling glasses to so-called "mid-range" markets, at lower cost.

One technical problem to be solved therefore consists of supplying an ophthalmic lens whose antisoiling properties are improved at lower cost relative to the ophthalmic lenses that have conventional antisoiling coatings.

Another technical problem to be solved is conversely to supply an ophthalmic lens having antisoiling properties surpassing the properties of the ophthalmic lenses with best performance known in the prior art of ophthalmic lenses, without the cost factor being predominant, for markets of the "premium" type.

Another technical problem consists of supplying an ophthalmic lens having both improved antisoiling properties and anti-abrasion properties relative to the known ophthalmic lenses.

Another technical problem consists of supplying an antisoiling ophthalmic lens that makes it possible to reduce the visual perception of the dirt by a wearer of glasses, and/or increase his visual acuity, in particular visual contrast, in different luminous environmental and wearing conditions.

A last technical problem consists of supplying an ophthalmic lens that can be edged (or trimmed) by conventional means, resulting in an ophthalmic lens that also solves at least one of the four problems stated above.

At the origin of the invention, the inventors found that, surprisingly, and contrary to what was commonly assumed, it was appropriate to improve the antisoiling properties on the rear face of an ophthalmic lens rather than on the front face or on both faces concomitantly.

Thus, the lenses according to the invention have properties of the front face that differ significantly from those of the rear face, with values of receding contact angle with water that are higher on the rear face than on the front face.

Earlier ophthalmic lenses generally comprise hydrophobic and/or oleophobic coatings identical on their front face and their rear face. Moreover, temporary layers deposited to facilitate edging are of identical nature and thickness on the front face and rear face of the lens.

Now, the inventors have found that it was advantageous to produce ophthalmic lenses whose front and rear faces are differentiated with respect to their hydrophobic properties.

The above aims may therefore be achieved separately or in combination by means of an ophthalmic lens comprising a substrate having:
- a front main face whose external surface is hydrophobic and has a receding contact angle with water WRA1 and
- a rear main face whose external surface has a receding contact angle with water WRA2 greater than or equal to 80°, and WRA2 is greater than WRA1.

The ophthalmic lenses according to the invention have a rear face that has antisoiling properties superior to those of the front face.

Moreover, it appears that, for hydrophobic layers, the property of abrasion resistance varies in the opposite direction to the surface properties. The less hydrophobic the layer, the higher the abrasion resistance (measured by the Bayer test (sand or alumina)). The invention therefore makes it possible to improve the abrasion resistance of the front face of the lens.

The rear face of the lens is the face closest to the skin and the eyelashes, which are significant sources of soiling. The inventors found that dirt on the rear face is perceived as particularly troublesome by a wearer of glasses.

It should be noted that usually ophthalmic lenses have a rear face that has properties of hydrophobicity lower than those of the front face.

In fact, most often, surface treatments with activated species before or during deposition of coatings (in particular antireflective layers) on the faces are employed. Now, the rear surface of a lens is generally the first of the two faces of the lens to receive the deposition of coatings, which involves a pretreatment of physical or chemical activation of the lens surface, intended to increase the adhesion of the coatings. This pretreatment is generally carried out under vacuum. It may be a bombardment with energetic species, for example an ion beam (IPC, Ion Pre-Cleaning) or an electron beam, treatment by corona discharge, by glow discharge, a UV treatment, or a plasma treatment under vacuum, generally with an oxygen or argon plasma. It may also be an adjuvant treatment, for example ion bombardment, during deposition of a layer, for example a conductive layer such as an ITO (Indium Tin Oxide) layer. When, in its turn, the front face of the lens is treated, the pretreatment of physical or chemical activation that it will undergo will slightly degrade the hydrophobic coating present on the rear face, owing to a phenomenon of backscatter of the reactive species, even if this hydrophobic coating is protected by a temporary layer. The consequence of this backscatter phenomenon, if the two faces of the lens have received the same hydrophobic treatment, is that the lens has slightly lower hydrophobic properties on the surface treated first, generally the rear face.

The ophthalmic lenses according to the invention may be used for improving the visual perception of a wearer of glasses and/or improve his visual comfort.

In the present application, a coating that is "on" a substrate/coating or that has been deposited "on" a substrate/coating is defined as a coating which (i) is positioned above the substrate/coating, (ii) is not necessarily in contact with the substrate/coating, i.e. one or more intermediate coatings may be arranged between the substrate/coating and the coating in question (however, it is preferably in contact with said substrate/coating). When "a layer 1 is located underneath a layer 2", it will be understood that layer 2 is farther from the substrate than layer 1. Similarly, a so-called "external" layer is farther from the substrate than a so-called "internal" layer.

The lens according to the invention comprises a substrate, preferably transparent, having front and rear main faces, where the rear face at least, preferably both of the main faces, comprise(s) a hydrophobic, preferably hydrophobic and oleophobic, coating.

The ophthalmic lens according to the invention may be an ophthalmic lens blank. It preferably constitutes an ophthalmic lens for glasses, and in one embodiment it is inserted in a pair of glasses.

The substrate of the ophthalmic lens according to the invention may be a mineral or organic glass, for example an organic glass of thermoplastic or thermosetting plastic.

This substrate may be selected from the substrates mentioned in application WO 2008/062142, for example a substrate obtained by (co)polymerization of diethylene glycol bis(allyl carbonate), a substrate of poly(thio)urethane, a substrate of bis(phenol A) polycarbonate (thermoplastic), designated PC, or a substrate of PMMA (polymethyl methacrylate).

The hydrophobic coatings used for the invention may be formed on a main face of a bare, i.e. uncoated, substrate, or on a main face of a substrate already coated with one or more functional coatings.

These functional coatings conventionally used in optics may be, non-exhaustively, a layer of shockproof primer, an anti-abrasion and/or anti-scratch coating, a polarized coating, a photochromic coating or a coloured coating, an interference coating, in particular a layer of shockproof primer coated with an anti-abrasion and/or anti-scratch layer.

The hydrophobic coating may be deposited on an interference coating, which may be, non-exhaustively, an antireflective coating, a reflecting (mirror) coating, an infrared filter, a filter or an antireflective coating at least partially cutting out blue light or an ultraviolet filter, preferably an antireflective coating.

An antireflective coating is defined as a coating, deposited on the surface of an article, which improves the anti-reflecting properties of the finished article. It makes it possible to reduce the reflection of light at the article-air interface over a relatively wide portion of the visible spectrum. Preferably Rv, the mean light reflectance value, is below 2.5% per face.

Rv is as defined in standard ISO13666:1998 and is measured according to standard iS 8980-4 (for an angle of incidence of the light below 17°, typically 15°). Preferably Rv<2%, better still Rv<1.5% and even better Rv<1%.

As is also well known, antireflective coatings conventionally comprise a monolayer or multilayer stack of dielectric materials. These are preferably multilayer coatings, comprising layers with high refractive index (HI) and layers with low refractive index (LI). The constitution of these coatings, their thickness and their method of deposition are notably described in application WO 2010/109154.

The interference coating is generally deposited on an anti-abrasion and/or anti-scratch coating, which may be any layer used conventionally as anti-abrasion and/or anti-scratch coating in the field of ophthalmic lenses.

Coatings that are resistant to abrasion and/or to scratching are preferably hard coatings based on poly(meth)acrylates or silanes generally comprising one or more mineral fillers intended to increase the hardness and/or refractive index of the coating once hardened. (Meth)acrylate means an acrylate or a methacrylate.

Among the coatings recommended in the present invention, we may mention the coatings based on hydrolysates of epoxysilanes such as those described in patents EP 0614957, U.S. Pat. Nos. 4,211,823 and 5,015,523. The thickness of the anti-abrasion and/or anti-scratch coating is generally in the range from 2 to 10 µm, preferably from 3 to 5 µm.

Before depositing the anti-abrasion and/or anti-scratch coating, it is possible to deposit a coating of primer on the substrate for improving the impact strength and/or adhesion of the subsequent layers in the end product. These coatings may be any layer of shockproof primer used conventionally for articles in transparent polymer, such as ophthalmic lenses, and are described in more detail in application WO 2011/080472.

Generally, the antisoiling coatings, also called hydrophobic coatings or top coats, are defined in the present application as coatings whose static contact angle with deionized water is greater than or equal to 75°, preferably greater than or equal to 80°, more preferably greater than or equal to 90°.

A coating having a receding contact angle with water greater than 80° is a hydrophobic coating according to the above definition.

In the present application, the static contact angles can be determined by the liquid drop method, according to which a drop of liquid having a diameter of less than 2 mm (typically 4 µL) is deposited gently on a non-absorbent solid surface and the angle at the interface between the liquid and the solid surface is measured. Water has a conductivity between 0.3 µS and 1 µS at 25° C.

Typically, measurements of static contact angle are performed with a DSA 100 apparatus (Drop Shape analysis system) from Kruss.

The values of receding contact angle with water are measured on an inclined plane according to the procedure described in the experimental section.

The antisoiling coatings reduce the sensitivity of the article to soiling, for example with respect to greasy deposits. As is known, these hydrophobic external coatings, described in detail in application WO 2009/047426, are obtained by applying compounds on the lens surface that decrease its surface energy. Preferably, the hydrophobic external coating applied on the front and/or rear face of the lens has a surface energy less than or equal to 20 mJ/m$^2$, more preferably less than or equal to 14 mJ/m$^2$, better still, less than or equal to 13 mJ/m$^2$, and even better less than or equal to 12 mJ/m$^2$.

In the context of the present invention, their thickness generally varies from 1 to 25 nm, better still from 1 to 15 nm.

In one embodiment of the invention, the antisoiling coating has a thickness of less than 10 nm, preferably from 2 to 10 nm, better still from 2 to 5 nm.

The hydrophobic coatings according to the invention are preferably of an organic nature. "Layer of an organic nature" means a layer comprising a non-zero proportion by weight, preferably of at least 40%, better still at least 50% of organic materials relative to the total weight of the layer.

Hydrophobic surface coatings are mainly obtained from polymerizable compositions containing at least one fluorinated compound, better still at least one compound of silane and/or silazane nature bearing one or more fluorinated groups, in particular fluorinated hydrocarbon groups, perfluorocarbon groups, fluorinated polyethers, such as the group $F_3C-(OC_3F_6)_{24}-O-(CF_2)_2-(CH_2)_2-O-CH_2-Si(OCH_3)_3$ or perfluoropolyether groups.

A conventional method for forming a hydrophobic coating consists of depositing compounds bearing fluorinated groups and Si—R groups, R representing a hydroxyl group or a precursor group such as a hydrolysable group, for example Cl, $NH_2$, NH— or —O-alkyl, preferably an alkoxy group. They are preferably produced starting from precursor fluorosilanes or fluorosilazanes, preferably comprising at least two hydrolysable groups per molecule. When deposited on a surface, these compounds are capable of undergoing reactions of polymerization and/or crosslinking, directly or after hydrolysis.

Fluorosilanes that are particularly suitable for forming hydrophobic coatings are those containing fluoropolyether groups described in U.S. Pat. No. 6,277,485.

These fluorosilanes correspond to the general formula:

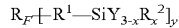

in which $R_F$ is a monovalent or divalent polyfluoropolyether group, $R^1$ is a divalent alkylene or arylene group or a combination thereof, optionally containing one or more heteroatoms or functional groups and optionally substituted with halogens, and preferably containing 2 to 16 carbon atoms; $R^2$ is a lower alkyl group (i.e. a $C_1$-$C_4$ alkyl group); Y is a halogen atom, a lower alkoxy group (i.e. a $C_1$-$C_4$ alkoxy group, preferably methoxy or ethoxy), or a lower acyloxy group (i.e. —OC(O)$R^3$ where $R^3$ is a $C_1$-$C_4$ alkyl group); x is 0 or 1; and y is 1 ($R_F$ is monovalent) or 2 ($R_F$ is divalent). Suitable compounds generally have a number-average molecular weight of at least 1000. Preferably, Y is a lower alkoxy group and $R_F$ is a perfluoropolyether group.

Other fluorosilanes or fluorosilazanes recommended are those of formula:

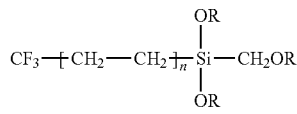

where n=5, 7, 9 or 11 and R is an alkyl group, preferably $C_1$-$C_{10}$, such as —$CH_3$, —$C_2H_5$ and —$C_3H_7$;

$CF_3(CF_2)_5CH_2CH_2Si(OC_2H_5)$ ((tridecafluoro-1,1,2,2-tetrahydro)octyl-triethoxysilane);

$CF_3-(C_F2)_7-CH_2-CH_2-Si(NH_2)_3$ (compound OF110™ from the Optron company); $CF_3CH_2CH_2SiCl_3$;

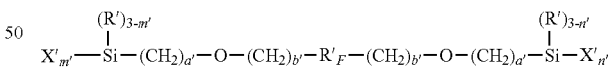

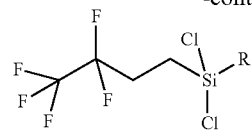

where n=7 or 9 and R is as defined above.

Compositions containing fluorosilanes also recommended for preparing hydrophobic coatings are described in U.S. Pat. No. 6,183,872. They contain fluoropolymers with organic groups bearing groups based on silicon represented by the following general formula and having a molecular weight from $5.10^2$ to $1.10^5$:

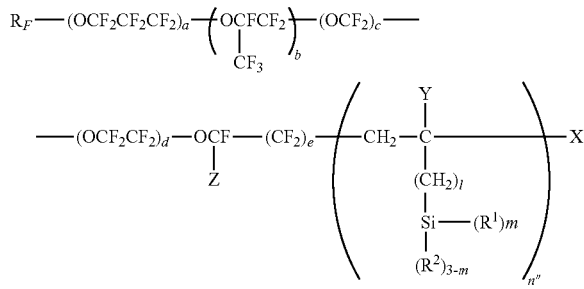

in which $R_F$ represents a perfluoroalkyl group; Z represents a fluoro or trifluoromethyl group; a, b, c, d and e each represent, independently of one another, 0 or an integer greater than or equal to 1, provided that the sum a+b+c+d+e is not less than 1 and that the order of the repeating units given in the parentheses subscripted with a, b, c, d and e is not limited to that shown; Y represents H or an alkyl group comprising 1 to 4 carbon atoms; X represents a hydrogen, bromine or iodine atom; $R^1$ represents a hydroxyl group or a hydrolysable group; $R^2$ represents a hydrogen atom or a monovalent hydrocarbon group; l represents 0, 1 or 2; m represents 1, 2 or 3; and n" represents an integer at least equal to 1, preferably at least equal to 2.

Other compounds suitable for forming antisoiling coatings based on fluorosilanes are described in patents JP 2005-187936 and EP 1300433, and correspond to the formula:

$$X'_{m'}-\underset{\underset{(R')_{3-m'}}{|}}{Si}-(CH_2)_{a'}-O-(CH_2)_{b'}-R'_F-(CH_2)_{b'}-O-(CH_2)_{a'}-\underset{\underset{(R')_{3-n'}}{|}}{Si}-X'_{n'}$$

in which $R'_F$ is a divalent perfluoropolyether radical with a linear chain, R' is a $C_1$-$C_4$ alkyl radical or a phenyl radical, X is a hydrolysable group, a' is an integer from 0 to 2, b' is an integer from 1 to 5, and m' and n' are integers equal to 2 or 3.

Commercial compositions for preparing hydrophobic coatings are the compositions KY130® (corresponding to the formula in patent JP 2005-187936) and KP 801M® marketed by Shin-Etsu Chemical, OF210™ and OF110™ marketed by Optron, and the composition OPTOOL DSX® (a fluorinated resin comprising perfluoropropylene groups corresponding to the formula in U.S. Pat. No. 6,183,872) marketed by Daikin Industries. The composition OPTOOL DSX® is the preferred antisoiling coating composition.

There are various methods for depositing the antisoiling coating compositions and they comprise liquid phase deposition, such as deposition by dipping, by centrifugation or spraying, or vapour phase deposition, such as evaporation under vacuum.

Vapour phase deposition is preferred.

A lens according to the invention comprises, on its rear face, a hydrophobic coating that may be selected from those presented above, which endows it with a receding contact angle with water WRA2 greater than or equal to 80°, preferably greater than or equal to one of the following values: 90°, 95°, 100°, 102°, 105°, 110°, 111°, 112°, 113°, 114°, 115°, 116°, 117°, 118°, 119°, 120°, 125°. Preferably, the static contact angle with water of the hydrophobic coating also has these values.

In one embodiment, WRA2 is lower than or equal to one of the following values: 119°, 118°, 117°, 116°.

Preferably WRA2≥107°, and better still varies from 107° to 125°.

Preferably WRA2≥110° and better still 110°≤WRA2≤120°, even better 112°≤WRA2. Preferably 112°≤WRA2≤120°.

Optimally, WRA2≥114°, better still 114°≤WRA2≤120°.

The receding angles WRA1 and WRA2 preferably satisfy the relationship:
2°≤WRA2−WRA1≤12° and 104°<WRA1<116° and 110°≤WRA2.

Preferably, WRA1 is greater than or equal to 65°, more preferably greater than or equal to 85°, better still greater than or equal to 95°. The receding contact angle with water WRA1 preferably varies from 102° to 116°, better still from 105° to 116°.

The external surfaces of the front and rear main faces of the lens of the invention are preferably surfaces of fluorinated coatings.

In one embodiment, the ophthalmic lens further comprises, on its front face, a hydrophobic coating that may be selected from those presented above, provided of course that the external surface of its front main face has a receding contact angle with water lower than that of its rear main face. In such a lens, the hydrophobic external surface of said front main face preferably has a receding contact angle with water greater than or equal to one of the following values: 85°, 90°, 95°, 100°, 110°.

Preferably, the difference between the receding contact angle with water of the external surface of the rear main face and the receding contact angle with water of the external surface of the front main face is greater than or equal to 1°, better still greater than or equal to 2°, and even better greater than or equal to 3°, and preferably less than or equal to 15°, better still less than or equal to 10° and even better less than or equal to 5°.

A difference in receding contact angle of only 1° between the front face and the rear face, although it seems slight at first glance, is in reality reflected in significant differences at the level of the antisoiling performance of the two faces, when we are at levels of receding contact angles with water as high as 100°. Beyond 110°, a difference in receding contact angle of only 1° between the front face and the rear face, even if it seems slight, is in reality reflected in considerable differences at the level of the antisoiling properties of the two faces of the lens.

In a preferred embodiment, the receding contact angle with water of the external surface of the front main face varies from 108° to 116°, better still from 109° to 115°, and the receding contact angle with water of the external surface of the rear main face is greater than 115°, better still greater than or equal to 116° and even better greater than or equal to 117°.

A lens according to the invention, in its final state, does not comprise a temporary layer on its rear main face, which means either that it was removed after it was deposited, or that no temporary layer was deposited. A lens according to the invention, in its final state, does not comprise (no longer comprises) a temporary layer on its front main face. In one embodiment, its rear main face is not coated and has not been coated with a temporary layer.

The ophthalmic lens according to the invention preferably does not absorb in the visible or absorbs little in the visible, which means, in the sense of the present application, that its transmission factor in the visible $\tau_v$, also called relative transmission factor in the visible, is greater than 90%, better still greater than 95%, even better greater than 96% and optimally greater than 97%.

Several means for obtaining lenses according to the invention, differentiated with respect to their hydrophobic properties on their two faces, will now be described, without the invention being limited to these specific means, as well as ophthalmic lenses obtained by these methods, which also form part of the invention.

A first technique for obtaining a lens having hydrophobic properties differentiated on its front face and its rear face consists of depositing different hydrophobic coatings on its two faces.

The invention therefore relates to a method for preparing an ophthalmic lens, comprising:
supplying a substrate having a front main face and a rear main face,
depositing a hydrophobic coating on said front main face, endowing this front main face with a receding contact angle with water WRA1, and a coating on said rear main face of the substrate, endowing this rear main face with a receding contact angle with water greater than or equal to 80°,
the hydrophobic coating of the front main face being formed from a material different from that of the coating of the rear main face and such that said front main face has a receding contact angle with water WRA1 lower than that of said rear main face WRA2.

Lenses according to the invention may thus be obtained by depositing a hydrophobic coating with better performance (i.e. conferring a higher receding contact angle with water) on their rear face than on their front face. For example, if the material Optool DSX® is deposited on the rear face of the lens (or an Optool DSX/OF210 bilayer), antisoiling materials giving smaller receding contact angles with water will have to be deposited on the front face, for example the materials OF210 or KY-130.

The above lenses are interesting as they can be edged without needing to deposit a temporary layer on their front face, owing to the lower surface energies imparted by the materials OF210 and KY-130, which prevent sliding of the lens during edging.

The invention also relates to a method for preparing an ophthalmic lens as described above comprising the following steps:
supplying an ophthalmic lens comprising a substrate having:
a front main face covered with a temporary layer, the external surface of said front main face being hydrophobic and having, after removal of said temporary layer, a receding contact angle with water WRA1, a rear main face optionally covered with a temporary layer, the external surface of said rear main face, after removal of said temporary layer if it is present, having a receding contact angle with water WRA2 greater than or equal to 80°, WRA2 being greater than WRA1;

removing the temporary layer from the front main face of said lens and, when it is present, the temporary layer from said rear main face.

The invention also relates to a method for preparing an ophthalmic lens, comprising:

supplying a substrate having a front main face and a rear main face, depositing a hydrophobic coating on said front main face and a hydrophobic coating on said rear main face of the substrate, which endows this rear main face with a receding contact angle with water greater than or equal to 80°, forming a temporary layer of thickness e1 on the hydrophobic coating of said front main face and, optionally, a temporary layer of thickness e2<e1 on the hydrophobic coating of said rear main face, removing the temporary layer from said front main face and, when it is present, the temporary layer of said rear main face.

In one embodiment of this method of the invention, a temporary layer of thickness e2 that is not zero and is less than e1 is formed on the hydrophobic coating of the rear main face of the lens.

One of the means for obtaining a lens according to the invention is to use the same material to form the hydrophobic coating of the front face and rear face of the lens. In other words, the lens has a front main face and a rear main face whose external surfaces are those of coatings formed from the same material. The inventors in fact discovered that by choosing to use a temporary layer of smaller (or even zero) thickness on the rear face, it was possible to obtain a higher receding contact angle with water on the rear face relative to the front face after removing the temporary layer or layers, and therefore superior antisoiling performance. Choosing to use a thinner temporary layer is also advantageous, in that the latter is easier to remove.

Another means for obtaining a lens according to the invention is to deposit a hydrophobic coating with better performance (i.e. conferring a higher receding contact angle with water, without coating with a temporary layer) on the rear face than on the front face of the lens.

In the embodiment in which temporary layers of different thicknesses are used, the thickness ratio of the temporary layers e1/e2 is preferably greater than or equal to 1.25, more preferably greater than or equal to 1.5, better still greater than or equal to 1.75, and even better, greater than or equal to 2. This ratio is preferably less than or equal to 5, better still less than or equal to 4, as a temporary layer that is too thick would become too difficult to remove after the edging operation.

In another embodiment of the invention, and preferably when the hydrophobic coating of the front main face and the hydrophobic coating of the rear main face are formed from the same material, the hydrophobic coating of the front main face, characterized by its receding contact angle with water WRA1, is deposited before deposition of the hydrophobic coating of the rear main face, characterized by its receding contact angle with water WRA2, and the rear main face of the ophthalmic lens has undergone a pretreatment of physical or chemical activation (which may be selected from the pretreatments described above) before depositing the hydrophobic coating on said rear main face but after or during deposition of the hydrophobic coating on said front main face. This method of deposition is used in particular when the concave face is not coated with a temporary layer.

The temporary layer present on the front face of the lens has a thickness preferably in the range from 30 to 45 nm. The temporary layer present on the rear face of the lens has a thickness preferably in the range from 15 to 30 nm.

In the latter case, this embodiment is associated with the use, on the front face of the lens, of a hydrophobic coating of greater thickness, whose performance, notably antisoiling performance, is improved and longer-lasting than that of a coating of smaller thickness.

It is necessary to know in fact that the thickness of the temporary layer present on the front face largely depends on the thickness of the hydrophobic coating on this same face. The thicker the hydrophobic coating on the front face, the thicker the temporary layer on the front face must be in order to perform its role of adhesion to the holding means during edging. Conversely, on the rear face of the lens, the thicknesses of the hydrophobic coating and of the temporary layer are unrelated, as the inventors had found that the latter could be omitted in the case when the front face can by itself provide good holding of the lens. Accordingly, its presence is not indispensable for ensuring holding of the lens during the edging operation, as is explained below.

It will be preferable to use, on the front face, the smallest possible thickness of the temporary layer allowing reliable edging of the lens to be carried out, in order to limit as far as possible the additional difficulty of removing this temporary layer.

In another embodiment of this method of the invention, no temporary layer is formed on the hydrophobic coating of the rear main face of the lens (e2=0). The inventors discovered that such deposition of a temporary layer on the rear face was not generally necessary, the presence of a temporary layer just on the front face of the lens being sufficient in the conditions stated above.

The lens is in fact fixed to the edging device via its front face, and it was found that of the order of 70% of the mechanical forces exerted during edging were exerted on the front face. Thus, poor adhesion of the holding means on the front face of the lens may lead to misalignment of the glass during trimming at a mechanical force far less than is necessary for the same misalignment if there is poor contact between the rear face of the lens and the trimming stop. Good holding of the lens during edging therefore essentially requires good adherence of the holding means to the front face of the lens.

This embodiment is very interesting in terms of productivity in an industrial context, as it reduces the cycle time by additionally eliminating the step of removal of the temporary layer on one of the faces. Moreover, it offers the benefit of optimum antisoiling properties on the rear face of the lens, as they have not been affected by deposition of a temporary layer.

In this instance, one of the means for obtaining a lens according to the invention is to use the same material to form the hydrophobic coating of the front face and of the rear face of the lens, in particular the material Optool DSX®. When the hydrophobic coating of the front main face and the hydrophobic coating of the rear main face are formed from the same material, deposition of a temporary layer on the hydrophobic coating of the front face and then its removal will supply a lens whose hydrophobic coating of the front face will have a receding contact angle with water lower than that of the rear face, which will not have undergone deposition and then removal of a temporary layer.

Another means for obtaining a lens according to the invention is to deposit a hydrophobic coating with better performance (i.e. conferring a higher receding contact angle with water, without coating with a temporary layer) on the rear face than on the front face of the lens.

It should be noted that it is preferable to form the coatings on the front face of the lens before forming them on the rear face of the lens, especially if no temporary layer is present on the rear face of the lens, as these depositions of coatings most often involve a pretreatment of physical or chemical activation (which may be selected from the pretreatments described above) or an adjuvant treatment, for example ionic adjuvant treatment, causing slight deterioration of the anti-soiling properties of the hydrophobic coating that will have been deposited first owing to the phenomenon of backscatter of the energetic and/or reactive species as explained above. Carrying out the treatment of the front face of the lens before the treatment of the rear face contributes to obtaining a lens according to the invention by slightly reducing the receding contact angle with water of the external surface of the front main face of the lens.

Thus, the invention is directed to a method for preparing an ophthalmic lens, comprising:

a) supplying an ophthalmic lens having a front main face and a rear main face, b) depositing coatings on the front main face of said ophthalmic lens, one of said coatings being a hydrophobic coating, c) depositing one or several coatings on the rear main face of said ophthalmic lens, after step b), d) recovering an ophthalmic lens having an external surface of said rear main face with a receding contact angle with water WRA2 higher than or equal to 80°, and an external surface of said front main face that is hydrophobic and has a receding contact angle with water WRA1, WRA2 being greater than WRA1, a treatment by energetic species backscattering on the rear main face of the ophthalmic lens having been implemented on the front main face of said ophthalmic lens, before step c), and a treatment with energetic species backscattering on the front main face of said ophthalmic lens having been implemented on the rear main face of said ophthalmic lens, after step b) and before step d).

"Energetic (and/or reactive) species" notably means species having an energy preferably in the range from 1 to 300 eV, preferably from 1 to 150 eV, better still from 10 to 150 eV, and even better from 40 to 150 eV. The energetic species may be chemical species such as ions or radicals, or species such as photons or electrons.

The invention also relates to the ophthalmic lenses obtained by the methods described above, notably an ophthalmic lens whose external surface of its front main face is hydrophobic and has a receding contact angle with water WRA1 and whose external surface of its rear main face has a receding contact angle with water WRA2 greater than or equal to 80°, WRA2 being greater than WRA1, said lens being obtained by forming a temporary layer of thickness e1 on the external surface of its front main face and, optionally, a temporary layer preferably having a thickness e2<e1 on the external surface of its rear main face, and by removing the temporary layer from said front main face and, when it is present, the temporary layer from said rear main face. As pointed out above, the hydrophobic coating of the front main face and the hydrophobic coating of the rear main face are preferably formed from the same material, and preferably no temporary layer is formed on the hydrophobic coating of said rear main face.

The temporary layers usable in the methods of the invention for coating a hydrophobic lens surface before edging will now be described more generally. In the present application, a temporary layer is a coating that can make the lens suitable for edging and is intended to be removed/withdrawn after the edging of the ophthalmic lens.

The temporary layer used in the context of the invention is generally formed directly on a hydrophobic coating.

The temporary layer may be of mineral or organic nature. In a preferred embodiment, the temporary layer is a mineral layer, and comprises in particular at least one metal fluoride or a mixture of metal fluorides, at least one metal oxide or a mixture of metal oxides, at least one metal hydroxide or a mixture of metal hydroxides. It is also possible to use a mixture of metal fluorides and metal oxides and/or hydroxides.

As examples of metal fluorides, we may mention magnesium fluoride $MgF_2$, lanthanum fluoride $LaF_3$, aluminium fluoride $AlF_3$ or cerium fluoride $CeF_3$. Preferably, magnesium fluoride will be used.

Metal oxides that may be used are magnesium oxide (MgO), calcium oxide (CaO), titanium oxide (notably $TiO_2$), silica, aluminium oxide ($Al_2O_3$), zirconium oxide ($ZrO_2$), or praseodymium oxide ($Pr_2O_3$). The oxides of metalloids are regarded as metal oxides in the present application. Mixtures of alumina and praseodymium oxide are recommended. A commercial material that is particularly recommended is PASO2 from the company LEYBOLD.

As examples of metal hydroxides, we may mention $Mg(OH)_2$, $Ca(OH)_2$ and $Al(OH)_3$, preferably $Mg(OH)_2$.

The temporary layer may also be of organic nature, and in particular it may be based on polymer materials. As examples of polymer materials suitable for the temporary layer we may mention the marking inks for progressive ophthalmic glasses and/or the resins constituting the binder of these inks as well as the alkyd resins.

We may also mention the halogenated polymers, notably chlorinated and/or fluorinated polymers, notably chlorinated polyolefin resins (for example a chlorinated polypropylene resin), the polyalkylene terephthalates (for example polyethylene terephthalate) and mixtures thereof. These materials are described in international application WO 2005/015270.

The mineral temporary layers are preferred.

The temporary layer may be monolayer or multilayer, which signifies that several temporary layers based on materials that may be identical or different can be formed on top of one other. In particular, the temporary layer may comprise a layer of a metal fluoride, preferably $MgF_2$, on which a layer of a non-fluorinated metal oxide or hydroxide, preferably MgO or $Mg(OH)_2$, better still MgO, is deposited.

The thickness of the temporary layer according to the invention may vary from 1 nm to 150 μm. When it consists of a mineral material, the thickness of the temporary layer is preferably ≥5 nm, better still ≥10 nm and preferably ≤200 nm, better still ≤100 nm and even better ≤50 nm. Typically it varies from 5 to 200 nm, preferably from 5 to 100 nm, better still from 10 to 50 nm.

In the case of organic materials, in particular polymer materials, it is preferable to deposit thicknesses much greater than in the case of purely mineral layers. The thicknesses required may then vary from 5 to 150 micrometres.

Generally, if the thickness of the temporary layer is too small, there is a risk that the surface energy will not be modified sufficiently. If, in contrast, the thickness of the temporary layer is too great, in particular for the essentially mineral layers, there is a risk of mechanical stresses developing within the layer, which may be detrimental to the expected properties.

The temporary layer preferably has a surface energy of at least 15 mJ/m$^2$, better still of at least 25 mJ/m$^2$. Typically, the surface energy of the temporary layer is from 15 to 70 mJ/m$^2$, preferably from 25 to 70 mJ/m$^2$.

The temporary layer may be deposited by any suitable conventional method, in the vapour phase (deposition under vacuum), or in the liquid phase, for example by spraying, centrifugation, or dipping, or by transfer from an electrostatic film. The temporary layer is preferably deposited by a gaseous route, notably by evaporation under vacuum. Deposition by vacuum treatment allows precise control of the thickness of the temporary layer and minimizes the dispersion, which is not necessarily the case with the other technical solutions available. Moreover, this vacuum treatment has the advantage that it can be directly integrated in the industrial process for treatment of optical articles, especially when the latter are provided with an anti reflective coating.

The temporary layer is preferably formed on the whole of a main surface of the lens, i.e. so that it covers the hydrophobic coating completely.

The material of the temporary layer according to the invention can be removed in a further operation following the edging step. The material of this temporary layer also has a sufficient force of cohesion so that removal of the temporary layer is effected without leaving residues on the surface of the hydrophobic coating.

Preferably, and quite particularly when the temporary protective layer is deposited on the whole of one of the faces of the lens, the material has a certain degree of transparency so that it is still possible for conventional measurements of power to be performed with a vertex refractometer on the lens coated with this temporary layer. The temporary layer may undergo marking by means of various marking inks, commonly used by a person skilled in the art for progressive lenses.

The temporary layer according to the invention offers the advantage that it can be removed very easily. This can be carried out either in a liquid medium, or by wiping, notably dry, or else by combined use of these two means. Other methods of removal in a liquid medium are notably described in application WO 03/057641. Wiping with a tissue or cloth is the preferred removal technique. It is preferably carried out manually.

Other temporary layers as well as the methods of deposition and removal thereof are described in applications EP 2088133, EP 1392613, and WO 2009/071818.

The invention also relates to intermediate ophthalmic lenses, formed or usable in the methods described above, which comprise at least one temporary layer on at least one of their main faces. The invention relates in particular to an ophthalmic lens comprising a substrate having:
  a front main face covered with a temporary layer, the external surface of said front main face being hydrophobic and having, after removal of said temporary layer, a receding contact angle with water WRA1, and
  a rear main face optionally covered with a temporary layer, the external surface of said rear main face, after removal of said temporary layer if it is present, being hydrophobic and having a receding contact angle with water WRA2 greater than or equal to 80°, the external surface of said front main face having (after removal of said temporary layer) a receding contact angle with water WRA1 lower than that of the rear main face WRA2.

Such a lens is an intermediate lens, made suitable for edging by the temporary layer, which will lead, after removal of the temporary layer from the front face and of the temporary layer optionally present on the rear face, to a lens according to the invention.

This intermediate ophthalmic lens generally comprises a hydrophobic coating on its rear face, and preferably a hydrophobic coating on its front face, which has subsequently been coated with said temporary layer. The temporary layers and hydrophobic coatings are selected from those described above. The hydrophobic coating of the front main face and the hydrophobic coating of the rear main face may or may not be formed from the same material.

In one embodiment, the rear main face of this lens is not coated and has not been coated with a temporary layer. In another embodiment, the rear main face is coated with a temporary layer with a thickness less than that of said temporary layer covering the front main face. The thickness ratios conceivable for the temporary layers e1/e2 were described above.

A preferred intermediate ophthalmic lens comprises a hydrophobic coating on the front face and on the rear face, preferably formed from the same material which preferably contains at least one fluorinated compound, better still at least one compound of silane and/or silazane nature bearing one or more fluorinated groups (in particular the material Optool DSX®), no temporary layer on the rear face, and a temporary coating on the front face, which may be multilayer, and preferably comprises a layer of MgF$_2$ coated with a layer of MgO. The preferred thicknesses for these various layers were stated above. On the front face, the layer of MgF$_2$ has an ideal thickness in the range from 30 to 40 nm and the hydrophobic coating has an ideal thickness preferably in the range from 1 to 10 nm. On the rear face, the hydrophobic coating has an ideal thickness in the range from 2 to 8 nm.

The ophthalmic lenses described above, which comprise at least one temporary layer, may be submitted to an edging process, which comprises the following steps:
  fixing the ophthalmic lens to a holding device via a holding means such as an adhesive block adhering to the surface of the ophthalmic lens (blocking);
  mounting the holding device, to which the ophthalmic lens adheres, via the holding means in an edging device;
  edging the ophthalmic lens by machining its periphery; and
  after recovery of the ophthalmic lens (deblocking), removal of the temporary layer from said front main face and, when it is present, removal of the temporary layer from said rear main face.

The temporary layer, or top layer, allows the holding means to be applied directly on the ophthalmic lens, and to hold it firmly during the edging operation, on the one hand on account of its good adhesion to the hydrophobic coating, and on the other hand by improving the normal and tangential adherence of the holding means to the lens surface. Accordingly, it prevents the phenomena of sliding and misalignment, as well as the phenomenon of deblocking, and makes it possible to carry out reliable edging.

Moreover, it provides very good holding of the lens after edging. After the main edging operation of the ophthalmic lens, we may in fact wish to carry out a repeat operation of edging, and/or piercing, the pierced zone serving for example as fixing point for a sidepiece of a spectacle frame in the case of a glass for spectacles. For these final steps, notably described in application WO 2009/071818, and in particular for piercing the glass, it is essential that the assembly of block-piece and holding means remains in position on the lens surface, as it constitutes a reference for positioning the drills for piercing the holes.

The steps of blocking, deblocking and the holding systems usable in this method, conventional for a person skilled in the art, are described in more detail in applications EP 1392613 and WO 2010/055261.

The edging process according to the invention supplies ophthalmic lenses that have undergone a maximum misalignment of 2°, and, optimally, less than or equal to 1°.

The edging step may optionally be followed by a step of repeat edging and/or a step of piercing, before the temporary layer or layers are removed.

The following examples illustrate the invention in more detail but without limiting it. Unless stated otherwise, all the thicknesses given in the present application are physical thicknesses.

After preparation, depending on the nature of the hydrophobic layer, it may be necessary to effect a mechanical treatment of the surface to "reveal" the properties of hydrophobicity and obtain the expected performance.

This is so in particular for the hydrophobic layers obtained from KY130.

In general, the properties of the layers obtained from OPTOOL DSX are obtained without needing to perform this mechanical treatment (wiping with a cloth impregnated with deionized water).

The measurements of the receding contact angles are carried out on glasses that have undergone the mechanical treatment. A suitable mechanical treatment (wiping with a CEMOI cloth) is presented below.

The CEMOI™ cloth is a microfibre cloth (manufacturer KB SEIREN; distributor: Facol) whose composition is polyester 70%/Nylon™ 30% and which is commonly used for cleaning spectacle lenses.

Mechanized wiping is carried out with the aid of a mechanized robot.

The lens is placed on a support. The CEMOI cloth is impregnated with deionized water and then placed on the glass. A lever weighing 3 kg is lowered so that it comes into contact with the cloth. The lever has a foam tip with a diameter of about 3 cm.

It goes to and fro 60 times in 1 minute. The tip follows the shape of the lens as it moves.

After treatment, the lenses are wiped with a clean Cemoi cloth and blown with an air gun.

The receding contact angle is measured in the wiped zone, at the centre.

The receding contact angle is defined in the doctorate thesis—University Paris 7—Denis Diderot, presented by Nolwenn Le Grand—Piteira and defended at ESCPI on 21 Jun. 2006, in particular Chapter 1, pages 19-20, paragraph 1.3.4 "A law that is inadequate in reality—Hysteresis of wetting".

The measurements were carried out using a semiautomatic goniometer with image acquisition and analysis from KRUSS-DSA100 equipped with the inclinable table option (PA3220).

Principle: Measurements of the receding contact angle with water may be performed on a convex surface of an ophthalmic lens, or each of the surfaces of a two-plane substrate (front face plane and rear face plane), each of the faces having received the different layers according to the invention, following the protocol described below for a convex face of a lens.

Measurements of Receding Contact Angle with Water on Convex Substrates:

The measurements are performed at the geometric centre of the convex face of spherical lenses with a radius of curvature >100 mm.

Measurement takes place in three steps:
application of a drop of deionized water with a volume of 25 µl at the geometric centre;
automatic inclination of the table at constant speed (3°/second) and continuous acquisition of the image of the moving drop;
analysis of images obtained from the acquisition sequence with determination of the speed of movement of the drop and of the contact angles at the triple point at the back of the drop Or. This is the contact angle formed between the tangent to the drop at the triple point (air/water/solid junction) and the tangent to the surface of the lens at the same triple point, the drop being examined in profile. By convention, the angle is that located within the drop.

The receding contact angle with water Or corresponds to the contact angle determined at the opposite point in the direction of movement of the drop.

The value of the receding contact angle with water considered in the tests described in the present application is the average of the values of angles for which the speed of movement of the drop is between 0.05 and 0.1 mm/s.

Measurements of contact angle may also be carried out following the same protocol on concave surfaces. In this case, it is desirable to use lenses possessing small curvatures on the rear face, i.e. R>200 mm.

It is possible to carry out edging of the lenses to keep the central part of the glass and perform the measurement on this central part.

EXAMPLES

The lenses on which the different layers are deposited are thermoplastic lenses in PC (polycarbonate), with a diameter of 70 mm.

The lenses comprise, on each of their main faces, deposited in this order: a coating of shockproof primer of polyurethane with a thickness of the order of 1 micron (W234®), an anti-abrasion coating with a thickness of the order of 3 microns obtained by depositing and hardening a composition as defined in example 3 of patent EP 614957, the antireflective coating with five layers $ZrO_2/SiO_2/ZrO_2/ITO/SiO_2$ described in application WO 2011/080472, and an antisoiling coating with thickness of 5 nm based on Optool DSX® from the company Daikin Industries (vacuum deposition at $3\times10^{-5}$ mbar, deposition rate: 0.4 nm/second, conditions identical to those used in application WO 2009/071818).

These lenses are treated on both faces by the methods described below, the concave (rear) face being treated before the convex (front) face.

1. Deposition of the Temporary Layers

In example 1, temporary layers of different thicknesses were formed on both faces of the lens in a BAK vacuum chamber.

Rear Face: Treatment 1:

A temporary layer of $MgF_2$ with thickness of 20 nm was formed on the hydrophobic coating of the rear face of the lens (deposition rate: 1.5 nm/s, P=3·10⁻³ Pa, then a layer of MgO with thickness from 1 to 2 nm was formed on this layer of MgF$_2$.

Front Face: Treatment 2:

A temporary layer of MgF$_2$ with thickness of 38 nm was formed on the hydrophobic coating of the front face of the lens, then a layer of MgO with a thickness from 1 to 2 nm was formed on this layer of MgF$_2$, in the same conditions as above.

The lenses obtained are submitted to an edging step. See point 2 below.

The temporary layers are removed by dry wiping with a cloth, and then the receding contact angles with water are measured according to the protocol given above.

Receding contact angle with water obtained after removal of the temporary layers).

The receding contact angle with water for the rear face coating (113°) is greater than that of the front face coating (111°).

2. Edging of the Lenses

The edging test, carried out on an Essilor Kappa grinder, as well as the protocol for measuring the misalignment suffered by the lenses during this operation, are described in detail in application WO 2009/071818. During this test, the adhesive holding block used (LEAP II, 24 mm diameter, GAM200 from the company 3M or secure Edge® from the company Saint Gobain) is directly in contact with the temporary layer present on the front face of the lens. A lens is considered to have passed the edging test if it has a misalignment of 2° or less.

3. Results and Commentary

The lens in example 1 has hydrophobic and/or oleophobic coatings of relatively large thicknesses on both faces with a rear face having a higher receding contact angle with water on the rear face.

The lens comprises a temporary layer of greater thickness on its front face (38 nm) than in the conventional lenses possessing a top layer of 20 nm of MgF$_2$, as described in U.S. Pat. No. 7,629,053 in the name of the applicant.

The thickness of the temporary layer on the rear face is the same as in the conventional lenses.

The lenses of this example display very good behaviour in the edging operation (no sliding of the holding block, no misalignment). Moreover, the temporary layers did not prove easy to remove.

The lenses according to the invention, for which the degree of hydrophobicity between the front face and the rear face was modulated, give better performance with respect to soiling than the lenses of the prior art.

Example 2

Lenses of polycarbonate or of high index glass (polythiourethane, refractive index 1.67) are prepared by performing the following depositions:

on the front face (convex): a layer of Optool DSX of the order of 5 nm is deposited and then treatment 1: a temporary layer of MgF$_2$ with thickness of 38 nm is formed on the hydrophobic coating of the rear face of the lens (deposition rate: 1.5 nm/s, P=3·10⁻³ Pa), and then a layer of MgO with a thickness from 1 to 2 nm was formed on this layer of MgF$_2$;

on the rear face (concave): deposition of a layer of Optool DSX of 3 nm and no deposition of a temporary layer.

Receding contact angle with water for the front face coating: 111° (after removal of the temporary layer)

Receding contact angle with water for the rear face coating: 115°.

Example 3

Lenses of polycarbonate or of high index glass (polythiourethane, refractive index 1.67) are prepared by performing the same depositions as in example 1:

front face (convex): a layer of Optool DSX of the order of 3 nm is deposited, and then treatment 1 (20-nm thick deposit of MgF2 followed by a layer of MgO with a thickness from 1 to 2 nm);

rear face (concave): deposition of a layer of Optool DSX of 3 nm and no deposition of a temporary layer.

Receding contact angle with water for the front face coating: 108° (after removal of the temporary layer)

Receding contact angle with water for the rear face coating: 115°

The results are summarized in Table 1 below.

The average misalignment of the glasses is very slight and is acceptable.

TABLE 1

|  | Accessory (holding block) | Storage | Substrate | Misalignment |
|---|---|---|---|---|
| Example 2 | 3M | 7 d RT | PC | 88.7 |
| Example 2 | 3M | 7 d RT | 1.67 | 89.1 |
| Example 2 | SecurEdge | 7 d RT | PC | 88.6 |
| Example 2 | SecurEdge | 7 d RT | 1.67 | 89.1 |
| Example 3 | 3M | 7 d RT | PC | 89.0 |
| Example 3 | 3M | 7 d RT | 1.67 | 89.1 |
| Ref | 3M | 7 d RT | PC | 88.9 |
| Ref | 3M | 7 d RT | 1.67 | 89.2 |

RT: room temperature;
7 d: 7 days
Ref: lens of the prior art

The invention claimed is:

1. An ophthalmic lens, comprising a substrate having:
a front main face having a receding contact angle with water WRA1 greater than or equal to 65°; and
a rear main face whose external surface has a receding contact angle with water WRA2 greater than or equal to 80°,
wherein WRA2 is greater than WRA1.

2. The ophthalmic lens of claim 1, wherein the receding contact angle with water WRA2 is greater than or equal to 95°.

3. The ophthalmic lens of claim 2, wherein the receding contact angle with water WRA2 greater than or equal to 107°.

4. The ophthalmic lens of claim 2, wherein 107°≤WRA2≤125°.

5. The ophthalmic lens of claim 3, wherein the receding contact angle with water WRA2 is greater than or equal to 110°.

6. The ophthalmic lens of claim 5, wherein the receding angles WRA1 and WRA2 satisfy the relationships: 2°≤WRA2−WRA1≤12° and 104°<WRA1<116°.

7. The ophthalmic lens of claim 5, wherein WRA2 is greater than or equal to 114°.

8. The ophthalmic lens of claim 1, wherein WRA1 is greater than or equal to 85°.

9. The ophthalmic lens of claim 6, wherein WRA1 is greater than or equal to 95°.

10. The ophthalmic lens of claim 6, wherein WRA1 ranges from 102° to 116°.

11. The ophthalmic lens of claim 1, wherein the external surfaces of the front and rear main faces are surfaces of fluorinated coatings.

12. The ophthalmic lens of claim 1, which has been obtained by forming a temporary layer on the external surface of said front main face and, optionally, a temporary layer on the external surface of said rear main face, and the temporary layer has been removed from said front main face and, when it is present, the temporary layer has been removed from said rear main face.

13. The ophthalmic lens of claim 12, which has been obtained by forming a temporary layer of thickness e1 on the external surface of said front main face and, optionally, a temporary layer of thickness e2<e1 on the surface of said rear main face, and the temporary layer has been removed from said front main face and, when it is present, the temporary layer has been removed from said rear main face.

14. An ophthalmic lens, comprising a substrate having:
a front main face covered with a temporary layer and having, after removal of said temporary layer, a receding contact angle with water WRA1 greater than or equal to 65°; and
a rear main face optionally covered with a temporary layer, the external surface of said rear main face, after removal of said temporary layer if it is present, having a receding contact angle with water WRA2 greater than or equal to 80°, WRA2 being greater than WRA1.

15. The ophthalmic lens of claim 1, wherein the rear main face is not coated and has not been coated with a temporary layer.

16. The ophthalmic lens of claim 14, wherein the rear main face is coated with a temporary layer with a thickness less than that of said temporary layer covering the front main face.

17. A method for preparing an ophthalmic lens, the method comprising:
supplying the ophthalmic lens of claim 14,
removing the temporary layer from the front main face of the ophthalmic lens and, when it is present, removing the temporary layer from the rear main face.

18. The method of claim 17, wherein the supplied ophthalmic lens has a front main face and a rear main face whose external surfaces are those of coatings formed from the same material, and the front and rear main faces are further coated with a temporary layer, the temporary layer of the rear main face having a thickness less than that of the temporary layer of the front main face.

19. The method of claim 17, wherein the external surfaces of the front main face and rear main face are respectively those having a receding contact angle with water WRA1 deposited on said front main face and of a coating having a receding contact angle with water WRA2 greater than or equal to 80°, deposited on said rear main face, WRA2 being greater than WRA1, and the coating of the front main face is deposited before the coating of the rear main face is deposited, and the rear main face of the ophthalmic lens has undergone a treatment with activated species before depositing the coating on said rear main face but after or during deposition of coatings on said front main face.

20. The method of claim 17, wherein no temporary layer is formed on said coating of the rear main face.

21. A method for preparing the ophthalmic lens of claim 1, the method comprising:
supplying an ophthalmic lens comprising a substrate having a front main face and a rear main face,
depositing a coating on said front main face of the substrate, endowing this front main face with the receding contact angle with the water WRA1 greater than or equal to 65°, and a coating on said rear main face of the substrate, endowing this rear main face with a receding contact angle with water WRA2 greater than or equal to 80°,
wherein the coating of the front main face being formed from a material different from that of the coating of the rear main face so that said front main face has a receding contact angle with water WRA1 lower than that of said rear main face WRA2.

22. A method for preparing the ophthalmic lens of claim 1, the method comprising:
a) supplying an ophthalmic lens having a front main face and a rear main face,
b) depositing coatings on the front main face of said ophthalmic lens,
c) depositing one or several coatings on the rear main face of said ophthalmic lens, after step b), and
d) recovering an ophthalmic lens having an external surface of said rear main face with a receding contact angle with water WRA2 higher than or equal to 80°, and an external surface of said front main face having the receding contact angle with water WRA1 greater than or equal to 65°, WRA2 being greater than WRA1,
further comprising a treatment by energetic species backscattering on the rear main face of the ophthalmic lens having been implemented on the front main face of said ophthalmic lens, before step c), and a treatment with energetic species backscattering on the front main face of said ophthalmic lens having been implemented on the rear main face of said ophthalmic lens, after step b) and before step d).

23. The ophthalmic lens of claim 1, wherein the receding contact angle with water WRA2 is greater than or equal to 116°.

24. The ophthalmic lens of claim 1, wherein the receding contact angle with water WRA2 is greater than or equal to 117°.

25. The ophthalmic lens of claim 1, wherein the receding contact angle with water WRA2 is greater than or equal to 118°.

26. The ophthalmic lens of claim 1, wherein the receding contact angle with water WRA2 is greater than or equal to 120°.

27. The ophthalmic lens of claim 1, wherein the receding contact angle with water WRA2 is greater than or equal to 125°.

* * * * *